(12) United States Patent
Watanabe

(10) Patent No.: US 8,062,461 B2
(45) Date of Patent: Nov. 22, 2011

(54) METHOD OF MANUFACTURING AN ELECTRO-OPTICAL DEVICE

(75) Inventor: Kazushige Watanabe, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 796 days.

(21) Appl. No.: 11/982,989

(22) Filed: Nov. 6, 2007

(65) Prior Publication Data

US 2008/0105368 A1    May 8, 2008

(30) Foreign Application Priority Data

Nov. 6, 2006 (JP) ................. 2006-299952

(51) Int. Cl.
- B32B 38/00 (2006.01)
- B32B 38/04 (2006.01)
- H01L 21/30 (2006.01)
- H01L 21/304 (2006.01)

(52) U.S. Cl. ........ 156/268; 156/250; 156/252; 156/253; 438/33; 438/106; 438/107; 438/110; 438/113; 438/118

(58) Field of Classification Search ................. 156/250, 156/252, 253, 268; 438/33, 106, 107, 110, 438/113, 118, 458, 460; 313/493, 506, 512; 445/12

See application file for complete search history.

(56) References Cited

U.S. PATENT DOCUMENTS

| | | | |
|---|---|---|---|
| 6,747,725 B2 * | 6/2004 | Chae et al. | 349/158 |
| 7,523,846 B2 * | 4/2009 | Takamatsu et al. | 225/2 |
| 2004/0166654 A1 * | 8/2004 | Matsuda et al. | 438/460 |
| 2005/0101109 A1 * | 5/2005 | Chin et al. | 438/464 |

FOREIGN PATENT DOCUMENTS

JP    2006-098632 A    4/2006

* cited by examiner

*Primary Examiner* — Philip Tucker
*Assistant Examiner* — Christopher C Caillouet
(74) *Attorney, Agent, or Firm* — AdvantEdge Law Group, LLC

(57) ABSTRACT

The disclosure is directed to method for manufacturing an electro-optical device. In one example, a method comprises forming a plurality of scribe lines in a substrate; forming cracks in the substrate which pass from the scribe lines through the substrate; and forming a plurality of dicing lines in the substrate along the scribe lines and the cracks. In one example, the dicing lines are formed at a depth that is less than a thickness of the substrate. This abstract is intended only to aid those searching patents, and is not intended to be used to interpret or limit the scope or meaning of the claims in any manner.

13 Claims, 6 Drawing Sheets

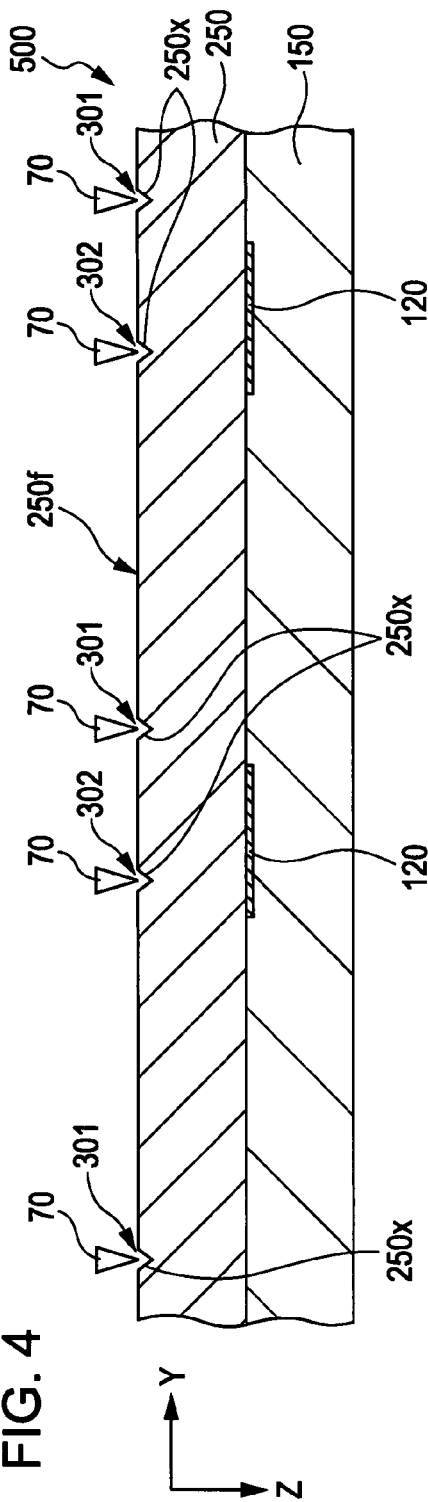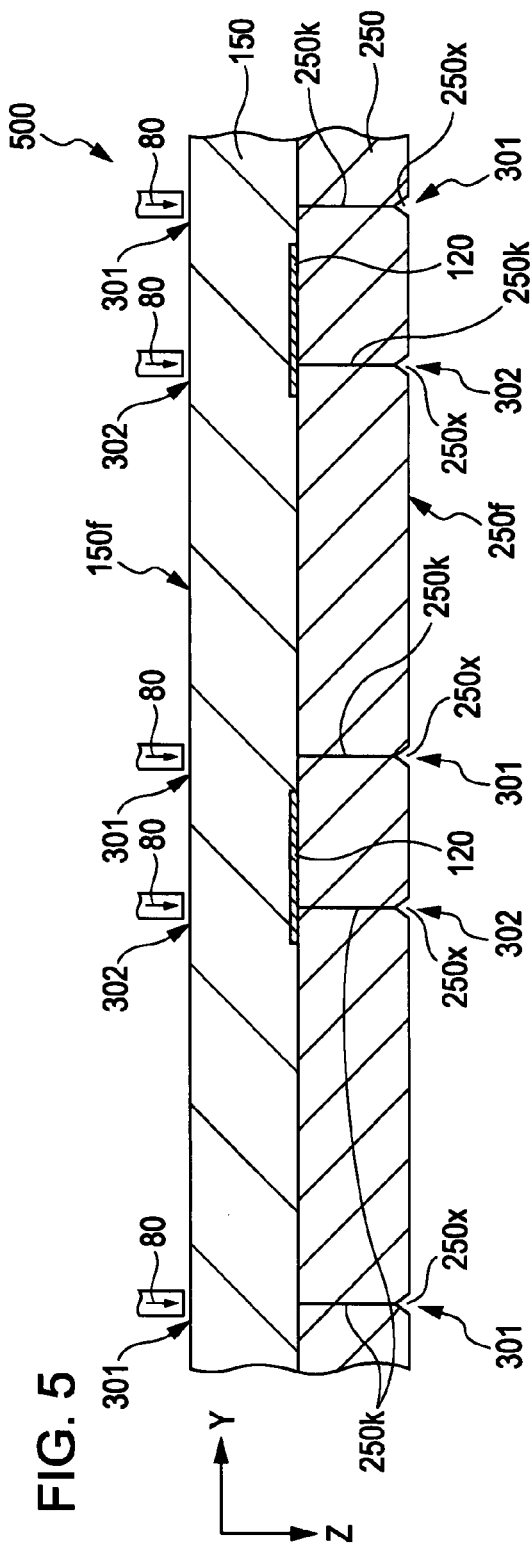

METHOD OF MANUFACTURING AN ELECTRO-OPTICAL DEVICE

CROSS-REFERENCE TO RELATED APPLICATIONS

The present application claims priority from Japanese Patent Application No. 2006-299952 filed on Nov. 6, 2006, the disclosure of which is hereby incorporated by reference in its entirety.

BACKGROUND

The disclosure relates to a method of manufacturing an electro-optical device with which a plurality of electro-optical panels are manufactured by attaching a first substrate to a second substrate and dividing the attached substrates into a plurality of sections.

In an electro-optical device such as a light-transmissive liquid crystal device, a liquid crystal panel which is an electro-optical panel configured by filling liquid crystal between two substrates formed of glass substrates or quartz substrates may be contained in a packaging case.

The liquid crystal device can be made to display an image by arranging switching elements such as thin-film transistors (TFTs) and pixel electrodes on one substrate of the liquid crystal panel in a matrix, arranging counter electrodes on the other substrate, and varying an optical response of a liquid crystal layer interposed between both substrates in accordance with an image signal.

A TFT substrate on which the TFTs are arranged and a counter substrate which faces the TFT substrate may be separately manufactured. The TFT substrate and the counter substrate may be formed by laminating a semiconductor thin film, an insulating thin film or a conductive thin film having a predetermined pattern on, for example, a quartz substrate. The semiconductor thin film, the insulating thin film or the conductive thin film may be formed by repeatedly performing a film forming process and a photolithography process.

The TFT substrate and the counter substrate may be attached with high precision (for example, an alignment error of 1μ or less) in a panel assembling process. In this panel assembling process, for example, alignment films which align liquid crystal molecules along the surface of the substrate are formed on surfaces of the TFT substrate and the counter substrate, both of which contact the liquid crystal layer.

Thereafter, the alignment films are subjected to a rubbing process for determining the arrangement of the liquid crystal molecules when a voltage is not applied. Next, in a liquid crystal dropping method, a seal material formed of an adhesive is formed on edges of a plurality of TFT substrates configured in a large substrate and a predetermined amount of liquid crystal is dropped onto liquid crystal filling regions of the TFT substrates surrounded by the seal material.

Next, in the large substrate assembling method, a first large plate including the plurality of TFT substrates and a second large plate including the plurality of counter substrates are attached to each other using the seal material or the adhesive for temporary fixation such that the TFT substrates and the counter substrates face each other. Thereafter, the attached substrates (hereinafter, referred to as a structure) are divided into a plurality of sets of the TFT substrate and the counter substrate which face each other and have a chip shape.

Next, a flexible printed circuit (FPC) for connecting an electronic device such as a projector to a liquid crystal device may be connected to an external connection terminal of the TFT substrate and, as a result, a liquid crystal panel is manufactured.

Thereafter, the liquid crystal panel is contained and fixed in a packaging case such that a liquid crystal device is manufactured. The manufactured liquid crystal device is provided in an electronic device such as a projector.

Examples of a method of dividing the structure into the plurality of sets of the TFT substrate and the counter substrate having the chip shape include a dicing process with excellent workability, high processing accuracy and outer shape accuracy necessary for the divided TFT substrate and counter substrate.

However, if the substrate is divided by passing a blade through the counter substrate in a thickness direction using the dicing process, a wiring line such as an external connection terminal or a driver circuit formed on the TFT substrate may be damaged by the blade, and consequently the manufacturing yield may deteriorate.

Accordingly, a method of dividing the structure into the plurality of sets of the TFT substrate and the counter substrate having the chip shape by a scribe/break process has been generally suggested and used.

In the scribe/break process, first, scribe lines are formed at division positions of the first large substrate including the plurality of TFT substrates and the second large substrate including the plurality of counter substrates using a scribe cutter by a scribe process.

Next, cracks passing through the substrates are generated in the thickness direction of the first large substrate and the second large substrate along the scribe lines by a break process of pressing the positions of the substrates facing the scribe lines, that is, the position of the second large substrate, including the plurality of counter substrates, facing the scribe line of the first large substrate after the scribe line has been formed on the first large substrate including the plurality of TFT substrates and the position of the first large substrate facing the scribe line of the second large substrate after the scribed line has been formed on the second large substrate. Finally, the structure is divided into the plurality of sets of the TFT substrate and the counter substrate having the chip shape using the generated cracks.

Japanese Patent Application Laid-Open Publication No. 2006-98632 discloses a technology for preventing division portions of the TFT substrate or the counter substrate of the liquid crystal panel after division from being damaged due to the pressure applied from the scribe cutter to the structure in the scribe process by including a jig member for supporting the substrate in a scribe device for performing the scribe process in the scribe/break process.

However, in the method of dividing the structure into the plurality of sets of the TFT substrate and the counter substrate having the chip shape by the scribe/break process, it may be difficult to form the scribe lines in a straight line shape in plan view with respect to the division positions of the first large substrate including the plurality of TFT substrates and the second large substrate including the plurality of counter substrates. That is, after the scribe process, the scribe lines may be formed on the large substrates so as to have a zigzag shape in plan view.

When the cracks are generated along the scribe lines by the break process, it is difficult to vertically generate the cracks in the thickness direction of the substrates at all the division positions.

The division end faces of the TFT substrate and the counter substrate of the liquid crystal panel after the division has been performed by the scribe/break process may vary in shape in plan view and may vary in shape in the thickness direction according to the division positions. For example, the cross-sectional shapes of the TFT substrate and the counter substrate formed by the division end faces may vary. Thus, it is difficult to ensure the outer shape accuracy necessary for the TFT substrate and the counter substrate.

As a result, when the liquid crystal panel is contained in the packaging case, for example, when the opposite end faces of the counter substrate are brought into contact with opposite walls of a containing chamber of the packaging case and the liquid crystal panel is contained in the containing chamber, the liquid crystal panel may become misaligned in the packaging case due to a counter substrate having a different cross-sectional shape and thus the manufacturing yield of the liquid crystal device may decrease.

SUMMARY

According to certain embodiments, an electro-optical device manufacturing method includes attaching a first substrate to a second substrate and dividing the attached substrates into a plurality of sections to manufacture a plurality of electro-optical panels. The method may further comprise: forming scribe lines in at least a portion of division positions of at least one of the first substrate and the second substrate; applying external force to the substrate in which the scribe lines are formed and forming cracks which pass through the substrate in a thickness direction of the substrate along the scribe lines; and forming dicing lines in the substrate, in which the scribe lines and the cracks are formed, by a predetermined depth along the scribe lines and the cracks, from a surface of the substrate in which the scribe lines are formed.

According to certain embodiments, in at least a portion of a process of dividing the electro-optical panels from a structure, since a dicing process having high accuracy is performed in addition to a scribe/break process including a scribe line forming process and a crack forming process, it is possible to form the substrate configuring the electro-optical panel divided from the structure with necessary outer shape accuracy by the dicing process of forming the dicing lines by the predetermined depth. Thus, the electro-optical panel can be contained in the packaging case with relatively high positional accuracy on the basis of the dicing process faces of the opposite end faces of the substrate after division, which are formed with high outer shape accuracy by the dicing process of forming the dicing lines by the predetermined depth. Accordingly, it is possible to provide a method of an electro-optical device, which is capable of, for example, improving manufacturing yield.

In certain embodiments, the depth of the dicing lines may be less than the thickness of the substrate in which the scribe lines and the cracks are formed.

The method may further include packaging each of the electro-optical panels after division in a packaging case, and the depth of the dicing lines may be set to a length of portions of an electro-optical panel containing chamber of the packaging case, which contact opposite end faces of the substrate after division.

According to certain embodiments, since the dicing lines are formed at a depth less than the thickness of the substrate which is subjected to the dicing process and the dicing lines are formed at a depth which is set to the length of the portions of the electro-optical panel containing chamber of the packaging case, which contact the opposite end faces of the substrate after division, the dicing process faces of the opposite end faces of the substrate, which is formed with necessary outer shape accuracy and is subjected to the dicing process, contact the containing chamber. Thus, the electro-optical panel can be contained in the packaging case with relatively high positional accuracy on the basis of the dicing process faces. In addition, since an adhesive may be sufficiently filled in a gap between the scribe/break process faces of the opposite end faces of the substrate after division, which are formed by the predetermined depth using the scribe/break process, and the walls of the containing chamber, the electro-optical panel may be contained and fixed in the packaging case with necessary positional accuracy. Accordingly, it is possible to provide a method of an electro-optical device, which is capable of improving manufacturing yield.

Wiring lines of each of the electro-optical panels may be formed on the first substrate, and when the dicing lines are formed in the second substrate, at least portions of the division positions of the second substrate may overlap the wiring lines of the first substrate in plan view.

According to certain embodiments, although the dicing lines are formed in the second substrate at positions overlapping the wiring lines in plan view in order to strip portions of the wiring lines of the first substrate, since the dicing lines are formed at a depth less than the thickness of the second substrate, the wiring lines of the first substrate are not damaged by the dicing process. Accordingly, it is possible to provide a method of an electro-optical device, which is capable of improving manufacturing yield.

Additional details and exemplary embodiments are disclosed below.

BRIEF DESCRIPTION OF THE DRAWINGS

Various embodiments are described with reference to the accompanying drawings, wherein like reference numbers designate like elements.

FIG. 4 is a partial cross-sectional view showing the structure of FIG. 3 in a state in which scribe lines are formed at division positions in an X direction of the second substrate.

FIG. 5 is a partial cross-sectional view showing the structure of FIG. 4 in a state in which cracks are formed at the division positions in the X direction of the second substrate.

DESCRIPTION OF EXEMPLARY EMBODIMENTS

Figure 1:
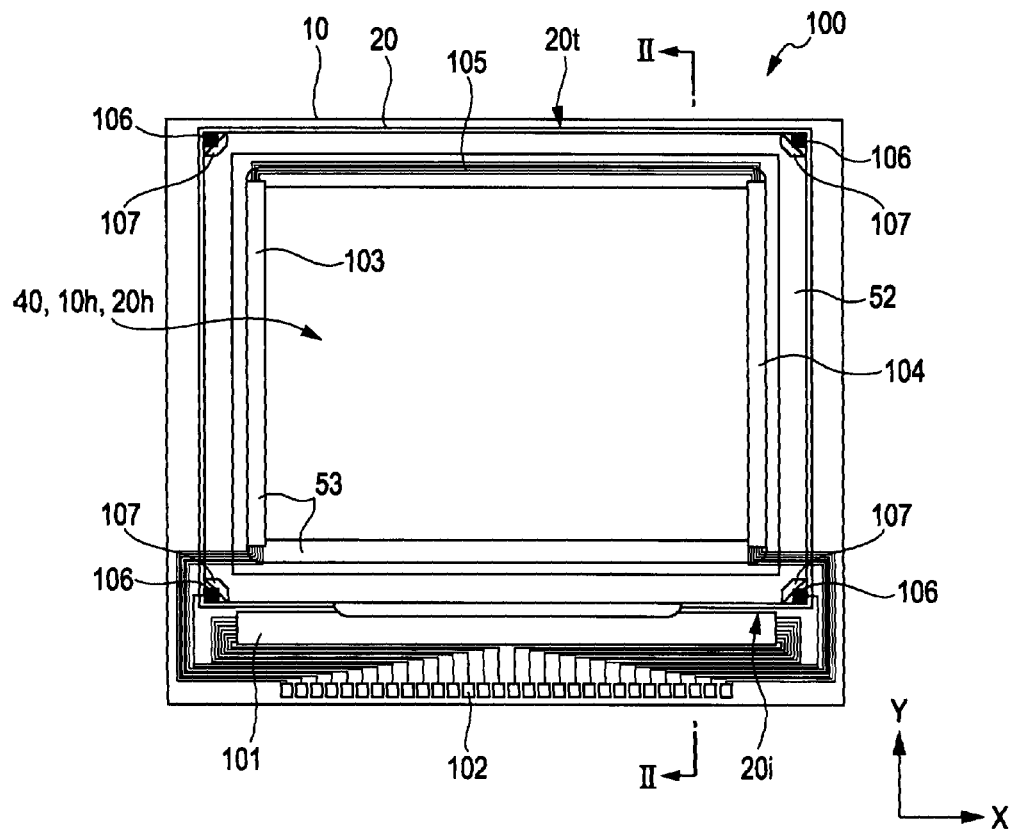
FIG. 1 is a schematic plan view illustrating the configuration of an exemplary liquid crystal panel.

Hereinafter, embodiments will be described with reference to the accompanying drawings. It will be readily understood that the components generally described and illustrated in the drawings herein, could be arranged and designed in a variety of different configurations.

Also, while the methods disclosed herein have been described and shown with reference to particular steps performed in a particular order, it will be understood that these steps may be combined, sub-divided, or re-ordered to form an equivalent method without departing from the teachings of the disclosure. Accordingly, unless specifically indicated herein, the order and grouping of the steps is not limited.

Thus, the following description, as represented in the drawings, is not intended to limit the scope of the disclosure but is merely representative of certain embodiments.

Methods of manufacturing an electro-optical device and methods of manufacturing a light-transmissive liquid crystal device will be described in accordance with certain embodiments. An electro-optical panel, such as, for example, a liquid crystal panel, may be included in the electro-optical device.

In a pair of substrates which face each other in a liquid crystal panel, one substrate may be a device substrate (hereinafter, referred to as a TFT substrate) and the other substrate may be a counter substrate which faces the TFT substrate.

First, the configuration of the liquid crystal panel included in the liquid crystal device manufactured by the method of manufacturing the liquid crystal panel according to certain embodiments will be described.

Figure 2:
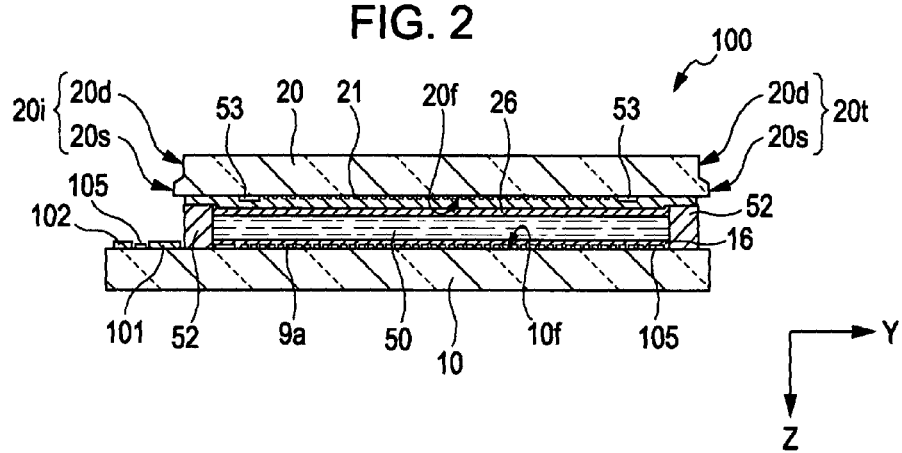
FIG. 2 is a cross-sectional view taken along line II-II of FIG. 1.

FIG. 1 is a schematic plan view illustrating the configuration of an exemplary liquid crystal panel, and FIG. 2 is a cross-sectional view taken along line II-II of FIG. 1.

As shown in FIGS. 1 and 2, a liquid crystal panel 100 includes a TFT substrate 10 formed of, for example, a glass substrate, a quartz substrate or a silicon substrate, a counter substrate 20 which faces the TFT substrate 10 and is formed of a glass substrate, a quartz substrate or a silicon substrate, and liquid crystal 50 interposed between the substrates. The TFT substrate 10 and the counter substrate 20 which face each other are attached to each other using a seal material 52.

A display region 10h of the TFT substrate 10 configuring a display region 40 of the liquid crystal panel 100 is configured in a region, which contacts the liquid crystal 50, of a surface 10f of the TFT substrate 10. Pixels are formed in the display region 10h and pixel electrodes (ITO) 9a for applying a driving voltage to the liquid crystal 50 together with counter electrodes 21 are arranged in a matrix.

The counter electrodes 21 for applying the driving voltage to the liquid crystal 50 together with the pixel electrodes 9a may be provided in a region, which contacts the liquid crystal 50, of a surface 20f of the counter substrate 20. A display region 20h of the counter substrate 20 configuring the display region 40 of the liquid crystal panel 100 may be configured in the region which includes the counter electrodes 21 formed therein and faces the display region 10h.

An alignment film 16 which is subjected to a rubbing process may be formed on the pixel electrodes 9a of the TFT substrate 10 and an alignment film 26 which is subjected to a rubbing process may be formed on the counter electrodes 21 formed over the entire surface of the counter substrate 20. The alignment films 16 and 26 may be formed of transparent organic films such as, for example, polyimide films.

In the display region 10h of the TFT substrate 10, a plurality of scan lines and a plurality of data lines (not shown) may be formed to be perpendicular to each other and the pixel electrodes 9a may be arranged in regions partitioned by the scan lines and the data lines in a matrix. TFTs (not shown) which are switching elements are provided in correspondence with intersections of the scan lines and the data lines and are respectively connected to the pixel electrodes 9a.

The TFTs are turned on by ON signals of the scan lines and thus image signals supplied to the data lines are supplied to the pixel electrodes 9a. Voltages between the pixel electrodes 9a and the counter electrodes 21 provided on the counter substrate 20 are applied to the liquid crystal 50.

A light-shielding film 53 provided as a frame region for defining the display region 40 of the liquid crystal panel 100 may be provided on the counter substrate 20.

When the liquid crystal 50 is filled between the TFT substrate 10 and the counter substrate 20 using a liquid crystal dropping method, the seal material 52 may be coated in a closed shape in plan view.

In an outer region of the seal material 52, a data line driving circuit 101 which is a wiring line for supplying the image signals to the data lines (not shown) of the TFT substrate 10 at a predetermined timing to configure a driver for driving the data lines and an external connection terminal 102 which is a wiring line for connection with an external circuit may be provided, for example, along one side of the TFT substrate 10. A flexible printed circuit (FPC) (not shown) for connecting a liquid crystal device to an electronic device such as a projector may be connected to the external connection terminal 102.

Scan line driving circuits 103 and 104 for supplying scan signals to scan lines of the TFT substrate 10 and the gate electrodes at a predetermined timing to configure a driver for driving the gate electrodes may be provided along two sides adjacent to the side along which the external connection terminal 102 of the TFT substrate 10 is provided. The scan line driving circuits 103 and 104 may be formed on the TFT substrate 10 at a position opposite the light-shielding film 53 provided inside the seal material 52.

On the TFT substrate 10, a wiring line 105 for connecting the data line driving circuit 101, the scan line driving circuits 103 and 104, the external connection terminal 102 and vertical conductive terminals 107 may be provided opposite three sides of the light-shielding film 53.

The vertical conductive terminals 107 may be formed on the TFT substrate 10 at four corners of the seal material 52. Vertical conductive materials 106 whose lower ends contact the vertical conductive terminals 107 and upper ends contact the counter electrodes 21 may be provided between the TFT substrate 10 and the counter substrate 20. The TFT substrate 10 and the counter substrate 20 are electrically connected by the vertical conductive materials 106.

An end face 20i of the counter substrate 20 configuring one side of the liquid crystal panel 100 on which the external connection terminal 102 is provided and an end face 20t facing the end face 20i may be configured by a dicing process face 20d and a bevel 20b which are formed by dicing lines 250d (see FIG. 7) with high accuracy and a scribe/break process face 20s which is formed by cracks 250k (see FIG. 7) formed by a scribe/break process with accuracy which varies according to the face.

The liquid crystal panel 100 having the above-described configuration may be contained and fixed in a packaging case 600 (see FIG. 9) such that the liquid crystal device 1 (see FIG. 9) may be manufactured.

Next, an exemplary method of manufacturing the liquid crystal panel 100 will be described with reference to FIGS. 3 to 8. The liquid crystal panel 100 according to certain embodiments may be formed by a large substrate assembling method of attaching a first large substrate including a plurality of TFT substrates 10 and a second large substrate including counter substrates 20 in the same number as the TFT substrates 10 to each other to form a structure and dividing the structure into a plurality of sets of the TFT substrate 10 and the counter substrate 20 which face each other so as to have a chip shape so as to manufacture a plurality of liquid crystal panels 100.

Referring now to FIGS. 3 to 8, for convenience of description, the data line driving circuit 101, the external connection terminal 102, the scan line driving circuits 103 and 104, the wiring line 105 formed on the TFT substrate 10 will be collectively referred to as wiring lines 120 and are briefly described. In FIGS. 3 to 8, in order to simplify the drawing, the components shown in FIG. 2, such as the liquid crystal 50 or the seal material 52, will be omitted.

Figure 3:
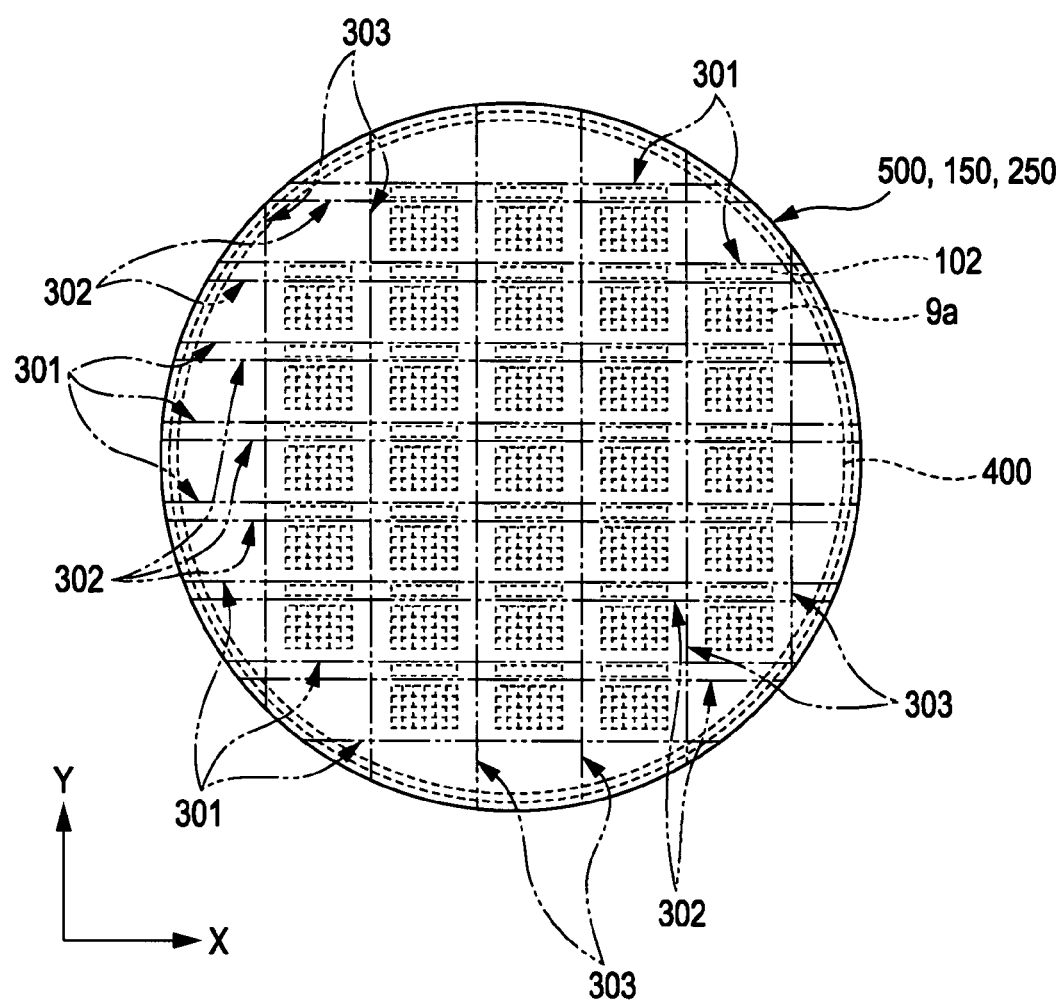
FIG. 3 is a plan view of an exemplary structure formed by attaching a first substrate and a second substrate to each other.

FIG. 3 is a plan view of an exemplary structure formed by attaching the first substrate and the second substrate to each other. FIG. 4 is a partial cross-sectional view illustrating the structure in a state in which scribe lines are formed at division positions in an X direction of the second substrate of the structure shown in FIG. 3. FIG. 5 is a partial cross-sectional view showing the structure in a state in which cracks are formed at the division positions in the X direction of the second substrate of the structure shown in FIG. 4.

Figure 6:
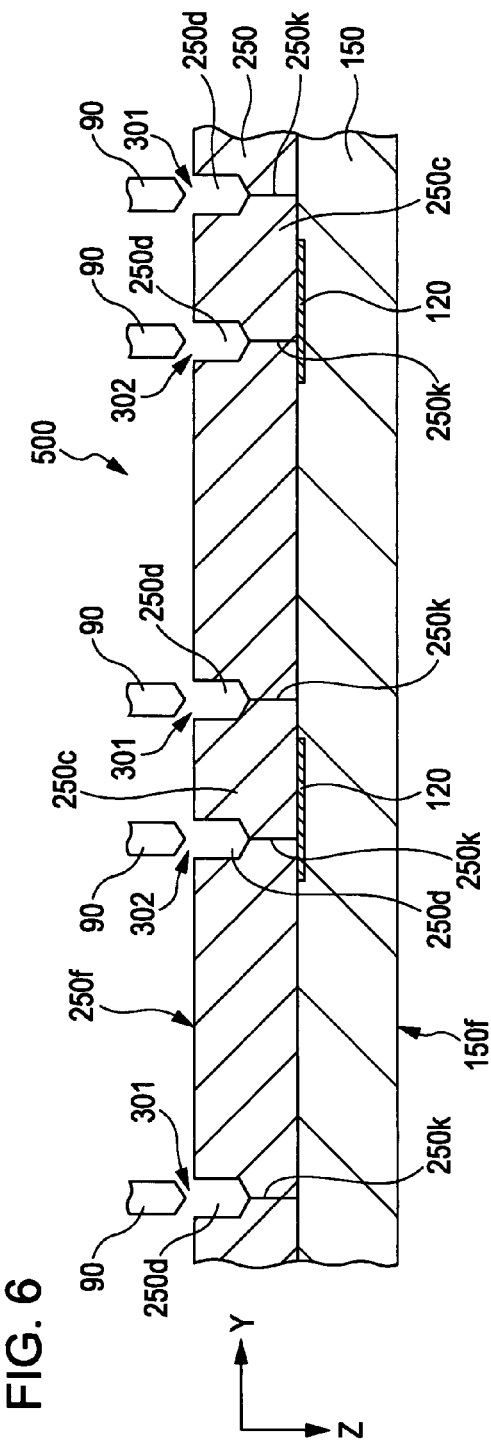
FIG. 6 is a partial cross-sectional view showing the structure of FIG. 5 in a state in which dicing lines are formed at the division positions in the X direction of the second substrate.

FIG. 6 is a partial cross-sectional view showing the structure in a state in which dicing lines are formed at the division positions in the X direction of the second substrate of the structure shown in FIG. 5.

Figure 7:
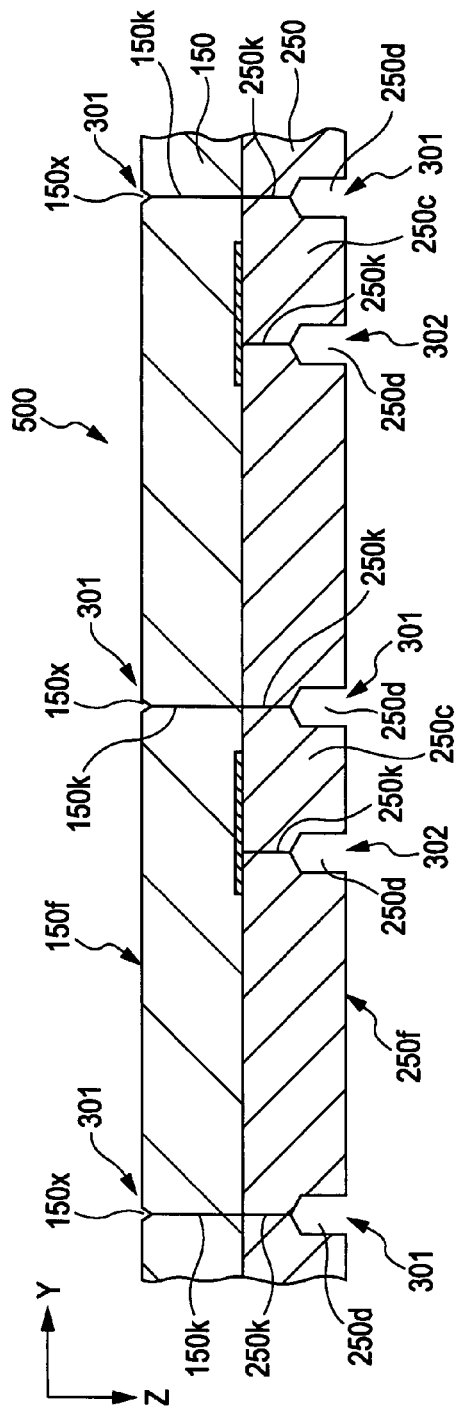
FIG. 7 is a partial cross-sectional view showing the structure of FIG. 6 in a state in which the scribe lines and the cracks are formed at the division positions in the X direction and a Y direction of the first substrate.

FIG. 7 is a partial cross-sectional view showing the structure in a state in which the scribe lines and the cracks are formed at the division positions in the X direction and a Y direction of the first substrate of the structure shown in FIG. 6.

Figure 8:
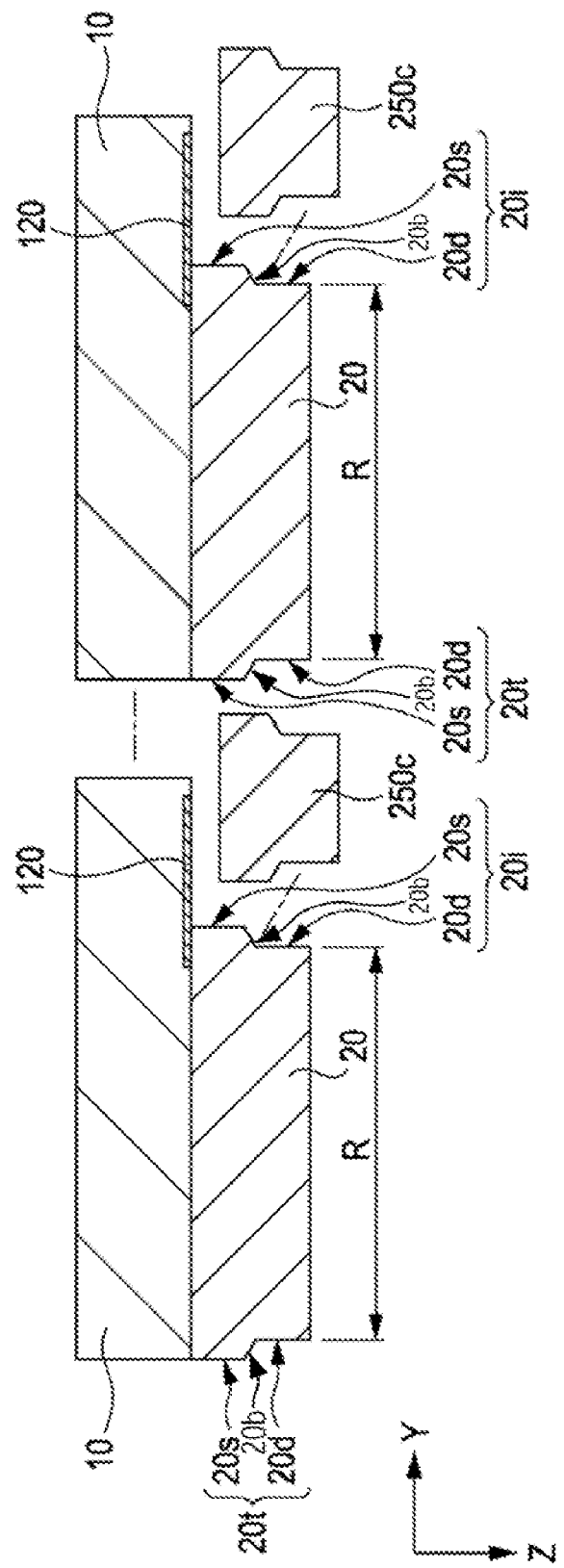
FIG. 8 is a cross-sectional view showing a state in which an exemplary liquid crystal panel is divided from the structure shown in FIG. 7.

FIG. 8 is a cross-sectional view showing a state in which a liquid crystal panel is separated from the structure shown in FIG. 7.

The first substrate 150 including the plurality of TFT substrates 10 on which the components such as the pixel electrodes 9a, the external connection terminal 102 and the wiring line 105 (see FIG. 2) may be formed by known film forming processes, and the second substrate 250 including the plurality of counter substrates 20 on which the components such as the counter electrodes 21 may be formed by known film forming processes, are attached to each other such that the surfaces thereof face each other, thereby forming the structure 500 as shown in FIG. 3. As shown in FIG. 3, the first substrate 150 and the second substrate 250 have a circular shape in plan view.

The first substrate 150 and the second substrate 250 are attached to each other using the seal material 52 coated on the TFT substrate 10 or an adhesive 400 for temporary fixation coated in the vicinities of the outer peripheral edges of the region in which the TFT substrate 10 of the first substrate 150 is configured.

As shown in FIG. 4, a scribe line forming process of forming a plurality of scribe lines 250X having a substantially straight line shape in the X direction at division positions 301 and 302 having a substantially straight-line shape in the X direction in a surface 250f of the second substrate 250 of the structure 500 shown in FIG. 3 using a known scribe cutter 70 is described.

The division positions 301 may be formed along a boundary in the X direction of the liquid crystal panel 100 when the plurality of liquid crystal panels 100 are divided from the structure 500 and the division positions 302 may be formed along a boundary when the wiring lines 120 formed on the TFT substrate 10 are stripped from the liquid crystal panel 100.

As shown in FIG. 5, a crack forming process of applying external force to the X-direction division positions 301 and 302 of the surface 150f of the first substrate 150, which face the scribe lines 250X, using, for example, a blade 80 may be performed.

By this process, cracks 250k may be generated in a thickness direction (hereinafter, referred to as a Z direction) of the second substrate 250 along the scribe lines 250X of the second substrate 250 so as to pass through the second substrate 250.

That is, a scribe/break process is performed with respect to the second substrate 250 by performing the scribe line forming process shown in FIG. 4 and the crack forming process shown in FIG. 5.

Referring now to FIG. 6, a dicing line forming process of forming a plurality of dicing lines 250d having a straight line shape in the X direction of FIG. 3 at the division positions 301 and 302 of the X direction in the surface 250f of the second substrate 250 of the structure 500 along the scribe lines 250X and the cracks 250k with a predetermined depth using a known dicing blade 90 may be performed.

At this time, the dicing lines 250d may be formed with a depth which is less than the Z-direction thickness of the second substrate 250, that is, a depth which is at least a half the Z-direction thickness of the second substrate 250. The dicing lines 250d may be formed with a depth which is a length of a wall 602s contacting the dicing process face 20d of the end faces 20i and 20t of the counter substrate 20 in a containing chamber 601 (see FIG. 9) of the packaging case 600 (see FIG. 9).

When the dicing lines 250d are formed, since the cracks 250k which pass through the second substrate 250 in the Z direction along the division positions 301 and 302 of the X direction are formed, a member 250c between the division positions 301 and the division positions 302 of the second substrate 250 may be moved in the X direction of FIG. 3. However, the movement of the member 250c may be restricted by the adhesive 400 between the first substrate 150 and the second substrate 250.

Next, a process of forming dicing lines (not shown) having a substantially straight line shape in the Y direction of FIG. 3 at division positions 303 having a substantially straight line shape in the Y direction of FIG. 3 in the surface 250f of the second substrate 250 of the structure 500 by a dicing process using the dicing blade 90 may be performed to pass through the second substrate 250 in the Z direction.

The division positions 303 may be formed along a boundary in the Y direction of the liquid crystal panel 100 when the plurality of liquid crystal panels 100 are divided from the structure 500.

Referring now to FIG. 7, a process of forming a plurality of scribe lines 150X having a substantially straight line at the division positions 301 of the first substrate 150 of the structure 500 in the X direction of FIG. 3, similar to the scribe/break process of the second substrate 250 shown in FIGS. 4 and 5, and forming a plurality of cracks 150k which pass through the first substrate 150 in the thickness direction (Z direction) along the scribe lines 150X may be performed.

A process of forming a plurality of scribe lines (not shown) having the substantially straight lines at the division positions 303 of the first substrate 150 of the structure 500 in the Y direction of FIG. 3 and forming a plurality of cracks which pass through the first substrate 150 in the Z direction along the scribe lines (not shown) may be performed.

As shown in FIG. 8, the structure 500 may be divided into the plurality of liquid crystal panels 100 each including the TFT substrate 10 and the counter substrate 20. Thus, according to these exemplary embodiments, the plurality of liquid crystal panels 100 may be manufactured.

In the exemplary liquid crystal panel 100 manufactured by the above-described method, the end face 20i of the counter substrate 20 configuring one side of the liquid crystal panel 100 on which the external connection terminal 102 is provided and the end face 20*t* facing the end face 20*i* may each be configured by the dicing process face 20*d* which is formed by the dicing line 250*d* with high accuracy, by the scribe/break process face 20*s* which is formed by the cracks 250*k* formed by the scribe/break process with accuracy which varies according to the face, and by the bevel 20*b* extending obliquely between the dicing process face 20*d* and the scribe/break process face 20*s* formed by the cracks 250*k*.

Since the dicing process face 20*d* in the end faces 20*i* and 20*t* of the counter substrate 20 is formed by the dicing process, the dicing process face 20*d* is vertically formed in the Z direction with higher accuracy, as compared with the scribe/break process face 20*s*. Accordingly, as shown in FIG. 8, a contour R between the end faces 20*i* and 20*t* in the counter substrate 20, that is, the contour of the counter substrate in the Y direction, may be formed by the dicing process faces 20*d* with necessary accuracy.

Figure 9:
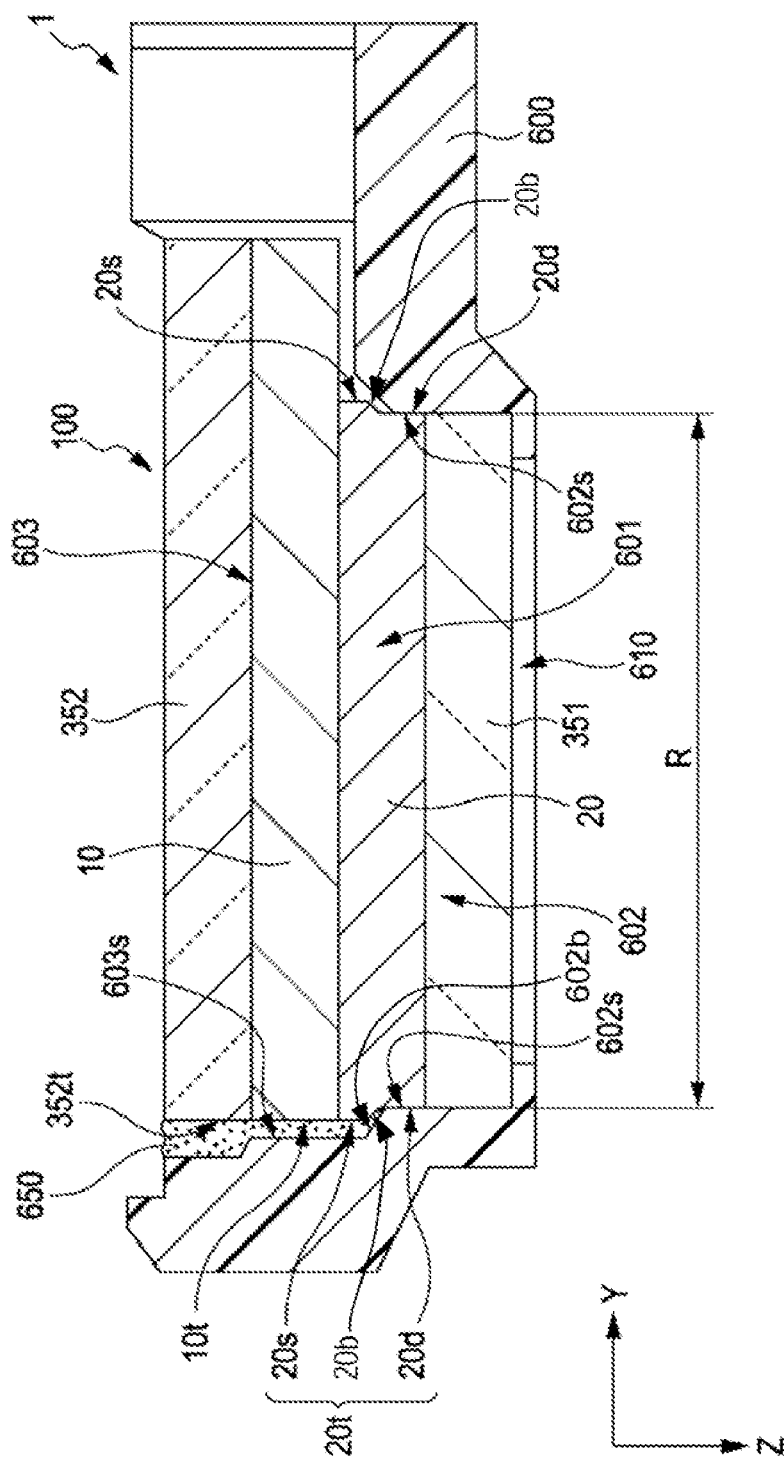
FIG. 9 is a schematic cross-sectional view showing a state in which an exemplary liquid crystal device is formed by containing the liquid crystal panel shown in FIG. 8 in a packaging case.

FIG. 9 is a schematic cross-sectional view showing a state in which an exemplary liquid crystal device is formed by containing the liquid crystal panel shown in FIG. 8 in a packaging case.

After manufacturing the liquid crystal panel 100, as shown in FIG. 9, dust-proof glasses 351 and 352 may be attached to the outer surfaces of the TFT substrate 10 and the counter substrate 20 and the liquid crystal panel 100 may be contained and fixed in the packaging case 600. As a result, the liquid crystal device 1 may be manufactured.

In FIG. 9, the dust-proof glasses 351 and 352 may have substantially the same size as the TFT substrate 10 and the counter substrate 20, but the sizes of the dust-proof glasses are not limited thereto. If the display region 10*h* of the TFT substrate 10 and the display region 20*h* of the counter substrate 20 are covered, the dust-proof glasses 351 and 352 may have a size smaller than that of the TFT substrate 10 and the counter substrate 20.

Next, an exemplary method of containing the liquid crystal panel 100 in the packaging case 600 will be briefly described. The packaging case 600 is a rectangular frame member for containing the liquid crystal panel 100 and the containing chamber 601 which is a stepped hole coinciding with the liquid crystal panel 100 in plan view is formed in the packaging case 600. An opening 610 having substantially the same size as the display region 40 of the liquid crystal panel 100 in plan view when the liquid crystal panel 100 is contained may be formed in the stepped containing chamber 601.

The counter substrate 20 of the liquid crystal panel 100 is inserted into the containing chamber 601 of the packaging case 600. The containing chamber 601 includes a hole part 601 with a bottom, which coincides with the contour R between the dicing process faces 20*d* of the end faces 20*i* and 20*t* of the counter substrate 20 in plan view and a hole part 603 which is slightly larger than the TFT substrate 10 in plan view. The hole part 603 is larger than the hole part 602 in plan view. That is, walls 602*s* of the hole part 602 substantially coincide with the contour R between the dicing process faces 20*d* of the end faces 20*i* and 20*t* of the counter substrate 20. A beveled portion 602*b* of hole part 602 extends obliquely from a wall 602*s* of hole part 602.

By the above-described configuration of the packaging case 600, when the liquid crystal panel 100 is contained in the containing chamber 601 of the packaging case 600, the dust-proof glass 351 attached to the counter substrate 20 may be mounted on the bottom of the hole part 602 and the dicing process faces 20*d* of the end faces 20*i* and 20*t* of the counter substrate 20 contact the pair of walls 602*s* of the hole part 602. As a result, the counter substrate 20, for example, the liquid crystal panel 100, is positioned with respect to the containing chamber 601 of the packaging case 600.

Referring now to FIG. 9, since the dust-proof glass 351 attached to the counter substrate 20 has substantially the same size as the hole part 602, the liquid crystal panel 100 may be positioned with respect to the packaging case 600 using the contour of the dust-proof glass 351. However, if the dust-proof glass 351 has a size smaller than that of the counter substrate 20 is attached to the counter substrate 20, the liquid crystal panel 100 may be positioned with respect to the packaging case 600 by the dicing process surfaces 20*d* of the counter substrate 20 which is formed with relatively high accuracy.

After the liquid crystal panel 100 has been positioned with respect to the packaging case 600, a photo-setting setting or thermosetting adhesive 650 may fill in gaps between the scribe/break process face 20*s* of the end face 20*t* of the counter substrate 20 and the end face 10*t* of the TFT substrate 10, and an end face 352*t* of the dust-proof glass 352 attached to the TFT substrate 10 and a wall 603*s* of the hole part 603 of the packaging case 600.

Although not shown, the adhesive 650 may also be made to fill in a gap between two sides adjacent to the end faces 10*t*, 20*t* and 352*t* and the wall 603*s*. The adhesive 650 may be cured such that the liquid crystal panel is fixed in the containing chamber 601 of the packaging case 600 with relatively high positional accuracy.

In certain emobiments, when the liquid crystal panel 100 is divided from the structure 500 obtained by attaching the first substrate 150 to the second substrate 250, the scribe lines 250X and the cracks 250*k* may be formed by the known scribe/break process and the dicing lines 250*d* having the predetermined depth may be formed by the dicing process along the scribe lines 250X and the cracks 250*k* at the division positions 301 and the division positions 302 in the X direction of the second substrate 250.

Accordingly, it is possible to form the counter substrate 20 configuring the liquid crystal panel 100 divided from the structure 500 with necessary accuracy by the dicing process having a division accuracy higher than that of the scribe/break process for forming the dicing lines by the predetermined depth. For example, the contour R between the dicing process faces 20*d* of the end faces 20*i* and 20*t* of the counter substrate 20 can be formed with necessary accuracy.

Accordingly, since the liquid crystal panel 100 can be contained in the containing chamber 601 of the packaging case 600 on the basis of the dicing process faces 20*d* with relatively high positional accuracy, it is possible to provide a method of manufacturing the liquid crystal device 1 capable of improving manufacturing yield of the liquid crystal device 1.

In certain embodiments, the depth of the dicing lines 250*d* formed in the second substrate 250 is less than the thickness of the second substrate 250 in the Z direction and is equal to the length of the wall 602*s* of the hole part 602 of the containing chamber 601 of the packaging case 600.

Accordingly, the dicing process faces 20*d* of the end faces 20*i* and 20*t* of the counter substrate 20 after division contact the walls 602*s* of the hole part 602 of the containing chamber 601 of the packaging case 600 and thus the liquid crystal panel 100 can be contained in the containing chamber 601 of the packaging case 600 with relatively high positional accuracy on the basis of the dicing process faces 20*d*.

Since the adhesive 650 may be sufficiently filled in the gap between the scribe/break process faces 20*s* of the end faces 20*i* and 20*t* of the counter substrate 20 and the wall 603*s* of the hole part 603 of the containing chamber 601, the liquid crystal panel 100 may be contained and fixed in the containing chamber 601 of the packaging case 600 with necessary positional accuracy. Accordingly, it is possible to provide a method of manufacturing the liquid crystal device 1, which is capable of improving the manufacturing yield of the liquid crystal device 1.

In certain embodiments, the dicing lines 250$d$ may be formed at the division positions 302 of the second substrate 250. That is, the member 250$c$ between the division position 301 and the division position 302 in the X direction of the second substrate 250 is removed and the dicing lines 250$d$ may be formed at the position overlapping the wiring lines 120 in plan view in order to strip the wiring lines 120 formed on the first substrate 150. The dicing lines 250$d$ formed at the division positions 302 may have a predetermined depth less than the thickness of the second substrate 250 in the Z direction, similar to the dicing lines 250$d$ formed at the division positions 301.

Although the dicing lines 250$d$ are formed in the second substrate 250 at the positions overlapping the wiring lines 120 of the first substrate 120, the wiring lines 120 are not damaged by the dicing process. Accordingly, it is possible to provide a method of manufacturing the liquid crystal device, which is capable of improving the manufacturing yield of the liquid crystal device.

Hereinafter, other embodiments are described. Although, at the division positions 301 and 302 of the second substrate 250 in the Z direction, the dicing lines 250$d$ may be formed by the predetermined depth less than the thickness of the second substrate 250 in the Z direction, in accordance with other embodiments, it is not so limited. The dicing lines 250$d$ may be formed so as to pass through the second substrate 250 at the division positions 301 if the wiring lines 120 are not damaged and the contour R between the dicing process faces 20$d$ of the end faces 20$i$ and 20$t$ of the counter substrate 20 has necessary accuracy. According to this exemplary manufacturing method, it is possible to simplify the manufacturing method.

Although the dicing lines may be formed in the second substrate 250 by a depth less than the thickness of the substrate by the dicing process in certain embodiments, other embodiments are not so limited. When the liquid crystal panel is positioned with respect to the packaging case 600 on the basis of the end faces of the TFT substrate 10, the dicing lines may be formed in the first substrate 150 at the division positions 301 in the X direction by the depth less than the thickness of the first substrate 150 in the Z direction. Accordingly, the liquid crystal panel 100 can be contained in the containing chamber 601 of the packaging case 600 with relatively high accuracy using the dicing process faces of the end faces of the TFT substrate 10.

Although the plurality of TFT substrates may be formed in the first substrate 150 and the plurality of counter substrates 20 may be formed in the second substrate 250 in certain embodiments, in other embodiments it is not so limited. The plurality of counter substrates 20 may be formed in the first substrate 150 and the plurality of TFT substrates 10 may be formed in the second substrate 250. In either case, the liquid crystal panel 100 can be contained in the packaging case 600 on the basis of the end faces of the TFT substrate 10 with relatively high positional accuracy.

Although the first substrate 150 is the substrate in which the plurality of TFT substrates 10 are formed and the second substrate 250 is the substrate in which the plurality of counter substrates 20 are formed in accordance with certain embodiments, other embodiments are not so limited. The first substrate 150 may be the substrate in which the plurality of TFT substrates 10 are formed and the second substrate 250 may be the large dust-proof glass 352 having the same size as the first substrate 150. In addition, certain embodiments may be applied when the TFT substrate 10 and the dust-proof glass 352 are divided from a structure obtained by attaching the first substrate 150 and the dust-proof glass 352 to each other in a chip.

The first substrate 150 may be the substrate in which the plurality of counter substrates 20 are formed and the second substrate 250 may be the large dust-proof glass 351 having the same size as the first substrate 150. In addition, certain embodiments may be applied when the counter substrate 20 and the dust-proof glass 351 are divided from a structure obtained by attaching the first substrate 150 and the dust-proof glass 351 to each other in a chip.

The liquid crystal device is not limited to the above-described embodiments and may be changed without departing from the scope of the invention. For example, although an active matrix liquid crystal display module using an active element such as a TFT is used as an exemplary liquid crystal device, other active elements, such as a thin-film diode (TFD) may be used.

Although a liquid device is used as the electro-optical device in certain embodiments, the invention is not limited to this and is applicable to a variety of electro-optical devices such as an electroluminescence device such as an organic electroluminescence device or an inorganic electroluminescence device, a plasma display device, a field emission display (FED) device, a surface-conduction electron-emitter display (SED) device, a light-emitting diode (LED) device, an electrophoretic display device, and a small-size television set using a thin cathode-ray tube or a liquid crystal shutter.

An electro-optical device may be, for example, a display device on which an element is formed on a semiconductor substrate, such as a liquid crystal on silicon (LCOS). In a LCOS, a single-crystal silicon substrate is used as the device substrate and transistors may be formed on the single-crystal silicon substrate as switching element used in pixels or peripheral circuits. Reflective pixel electrodes may be used as the pixels such that the pixel elements are formed below the pixel electrodes.

The electro-optical device may be a display device on which a pair of electrodes is formed on the same layer of one substrate, such as an in-plane switching (IPS) device, or a display device on which a pair of electrodes is formed on one substrate with an insulating film interposed therebetween, such as a fringe field switching (FFS) device.

It should be understood that the preceding is merely a description of several embodiments. While specific embodiments and applications have been illustrated and described, the precise configuration and components disclosed herein is illustrative only and not limiting in any sense. Having the benefit of this disclosure, various modifications, changes, and variations will be apparent to those of ordinary skill in the art without departing from the spirit and scope of the principles disclosed. Thus, to the maximum extent allowed by law, the scope of the invention is to be determined by the broadest permissible interpretation of the following claims and their equivalents and shall not be restricted or limited by the foregoing description.

What is claimed is:

1. An electro-optical device manufacturing method for attaching a first substrate to a second substrate and dividing the attached substrates into a plurality of sections for manufacturing a plurality of electro-optical panels, the method comprising:

attaching a first substrate to a second substrate using a seal material or an adhesive;

following attachment of the first substrate to the second substrate, forming a first set of scribe lines in at least a portion of division positions of the second substrate;

following formation of the first set of scribe lines in the second substrate, applying an external force to the second substrate to form a first set of cracks which pass through the second substrate in a thickness direction of the second substrate along the first set of scribe lines;

following formation of the first set of cracks in the second substrate, forming dicing lines in the second substrate, the dicing lines being formed along the first set of scribe lines and the first set of cracks at a predetermined depth from a surface of the second substrate, the dicing lines forming dicing process faces that are substantially parallel to each of the first set of cracks and forming bevels extending obliquely between the dicing process faces and each of the first set of cracks;

following formation of the dicing lines in the second substrate, forming a second set of scribe lines in at least a portion of division positions of the first substrate;

following formation of the second set of scribe lines in the first substrate, applying an external force to the first substrate to form a second set of cracks which pass through the first substrate in a thickness direction of the first substrate along the second set of scribe lines;

dividing the first and second substrates into electro-optical panels; and package in each electro-optical panel into a packaging case having a containing chamber, wherein each containing chamber has a wall portion and a beveled portion extending obliquely from the wall portion, the wall portion contacting at least one of the dicing process faces of the electro-optical panel and the beveled portion and the beveled portion being disposed adjacent to at least one of the bevels of the electro-optical panel.

2. The method according to claim 1, wherein the depth of the dicing lines is less than a thickness of the second substrate.

3. The method according to claim 2, wherein the depth of the dicing lines is set to a distance equal to a length of a portion of the containing chamber which makes contact with opposite end faces of the second substrate.

4. The method according to claim 1, wherein wiring lines of each of the electro-optical panels are formed on the first substrate, and when the dicing lines are formed in the second substrate, at least portions of the division positions of the second substrate overlap the wiring lines of the first substrate in plan view.

5. A method for manufacturing an electro-optical device, comprising:

attaching a first substrate to a second substrate using a seal material or an adhesive;

following attachment of the first substrate to the second substrate, forming a first plurality of scribe lines in the second substrate in at least a portion of division positions of the second substrate;

following formation of the first plurality of scribe lines in the second substrate, forming a first plurality of cracks in the second substrate which pass from the first plurality of scribe lines through the second substrate;

following formation of the first plurality of cracks in the second substrate, forming a plurality of dicing lines in the second substrate along the first plurality of scribe lines and the first plurality of cracks, the dicing lines being formed at a depth that is less than a thickness of the second substrate, the dicing lines forming dicing process faces that are substantially parallel to each of the first plurality of cracks and forming bevels extending obliquely between the dicing process faces and each of the first plurality of cracks;

following formation of the plurality of dicing lines in the second substrate, forming a second plurality of scribe lines in the first substrate in at least a portion of division positions of the first substrate;

following formation of the second plurality of scribe lines in the first substrate, forming a second plurality of cracks in the first substrate which pass from the second plurality of scribe lines through the first substrate;

dividing the first and second substrates into electro-optical panels; and packaging each electro-optical panel into a packaging case having a containing chamber, wherein each containing chamber has a wall portion and a beveled portion extending obliquely from the wall portion, the wall portion contacting at least one of the dicing process faces of the electro-optical panel and the beveled portion being disposed adjacent to at least one of the bevels of the electro-optical panel.

6. The method according to claim 5, wherein the dicing lines are formed at a depth that is at least half of the thickness of the second substrate.

7. The method according to claim 5, further comprising:
forming wiring lines on the first substrate, forming dicing lines so as to overlay a portion of each of the wiring lines when viewed in plan view.

8. The method according to claim 7,
wherein the containing chamber contacts end faces of the second substrate.

9. A method for manufacturing electro-optical panels, comprising:

attaching a first substrate to a second substrate using a seal material or an adhesive;

following attachment of the first substrate to the second substrate, forming a first set of scribe lines using a scribe cutter at division positions on a surface of the second substrate, the first set of scribe lines being formed in substantially straight lines along a length of the second substrate;

following formation of the first set of scribe lines in the second substrate, applying an external force to form a first set of cracks at the division positions that extend from the first set of scribe lines through a thickness of the second substrate;

following formation of the first set of cracks in the second substrate, forming dicing lines using a dicing blade at the division positions, the dicing lines being formed in substantially straight lines along the length of the second substrate and having a depth extending from the surface into the second substrate, the depth being less than the thickness of the second substrate, the dicing lines forming dicing process faces that are substantially parallel to each of the first set of cracks and forming bevels extending obliquely between the dicing process faces and each of the first set of cracks;

following formation of the dicing lines in the second substrate, forming a second set of scribe lines using a scribe cutter at division positions on a surface of the first substrate, the second set of scribe lines being formed in substantially straight lines along a length of the first substrate;

following formation of the second set of scribe lines in the first substrate, applying an external force to form a second set of cracks at the division positions that extend from the second set of scribe lines through a thickness of the first substrate;

dividing the first and second substrates into electro-optical panels; and packaging in each electro-optical panel into a packaging case having a containing chamber, wherein each containing chamber has a wall portion and a beveled portion extending obliquely from the wall portion, the wall portion contacting at least one of the dicing process faces of the electro-optical panel and the beveled portion being disposed adjacent to at least one of the bevels of the electro-optical panel.

10. The method according to claim 9, wherein the act of forming dicing lines includes forming dicing lines having a depth substantially equal to a length of the wall portion of the packaging case containing chamber.

11. The method according to claim 9, wherein the dicing lines are formed at a depth that is at least half of the thickness of the second substrate.

12. The method according to claim 9, further comprising:
forming wiring lines on the first substrate; and
forming dicing lines so as to overlay a portion of each of the wiring lines when viewed in plan view.

13. The method according to claim 9,
wherein the containing chamber makes contact with end faces of the second substrate.

* * * * *